US008775466B2

(12) United States Patent
Tamayo et al.

(10) Patent No.: US 8,775,466 B2
(45) Date of Patent: Jul. 8, 2014

(54) PROJECTION MINING FOR ADVANCED RECOMMENDATION SYSTEMS AND DATA MINING

(71) Applicant: Oracle International Corporation, Redwood Shores, CA (US)

(72) Inventors: Pablo Tamayo, Hopkinton, MA (US); Mark Hornick, Andover, MA (US); Marcos C. Campos, Billerica, MA (US); Boriana Milenova, Reading, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/875,178

(22) Filed: May 1, 2013

(65) Prior Publication Data

US 2013/0246319 A1    Sep. 19, 2013

Related U.S. Application Data

(63) Continuation of application No. 12/324,295, filed on Nov. 26, 2008, now abandoned.

(60) Provisional application No. 61/049,150, filed on Apr. 30, 2008.

(51) Int. Cl.
*G06F 7/00* (2006.01)
*G06F 17/30* (2006.01)

(52) U.S. Cl.
USPC .......................................... 707/776

(58) Field of Classification Search
USPC ........................................ 707/776, 999.101
See application file for complete search history.

(56) References Cited

U.S. PATENT DOCUMENTS

| | | | |
|---|---|---|---|
| 2002/0082901 A1* | 6/2002 | Dunning et al. | 705/10 |
| 2002/0083067 A1* | 6/2002 | Tamayo et al. | 707/100 |
| 2004/0225556 A1 | 11/2004 | Willen et al. | |
| 2006/0047557 A1 | 3/2006 | Bieselin et al. | |
| 2008/0306895 A1 | 12/2008 | Karty | |
| 2009/0055139 A1 | 2/2009 | Agarwal et al. | |

* cited by examiner

*Primary Examiner* — Alexey Shmatov
(74) *Attorney, Agent, or Firm* — Hickman Palermo Truong Becker Bingham Wong LLP

(57) ABSTRACT

A method for projection mining comprises performing a first projection on a first data object of a first type comprising a plurality of data entries and a second data object of a second type comprising a plurality of data entries to create definitions of attributes of the first data object and definitions of attributes of the second data object, performing a second projection of the definitions of the attributes of the first data object and the definitions of the attributes of the second data object into a space of meta-attributes based on semantic relationships among the attributes of the first data object and the second data object, learning relationships between the space of meta-attributes formed by the projections of the first data object and the second data object and a space of meta-attributes relating to new data not included in the first data object and the second data object, and generating at least one new data object of the first or second type based on the new data using the learned relationships.

24 Claims, 13 Drawing Sheets

| REG_ID | REGISTRAIL | JOB_TITLE | REG TIER 1 | REG TIER 2 | CITY | STATE | ZIP | COUNTRY | PROMO_ID | COMP |
|---|---|---|---|---|---|---|---|---|---|---|
| W0909258 | 23 OCTOBE... | DIRECTOR | EXHIBITOR | EXHIBITOR STAFF | HYDERABAD | IN | 500029 | USA | | |
| W0930304 | 09 NOVEMB... | MARKETING MA... | EXHIBIT HALL | OPENWORLD... | CORTE MADERA | CA | 94925 | USA | | |
| OS933265 | 10 NOVEMB... | DEPUTY GROU... | FULL CONFERE... | FULL CONFERE... | KUALA LUMPUR | | 40030 | MALAYSIA | APAC | APAC16: |
| W0907922 | 21 OCTOBE... | HEAD, VIRTUAL... | FULL CONFERE... | FULL CONFERE... | KUALA LUMPUR | | 50050 | MALAYSIA | APAC | APAC73: |
| W0865805 | 06 SEPTEMB... | PREACHER | FULL CONFERE... | FULL CONFERE... | YOKOHAMA-SHI | KANAGAWA | 220-8401 | JAPAN | | |
| W0881595 | 01 NOVEMB... | VICE PRESIDE... | LEADERS CIRCLE | LEADERS CIRCLE | SIMI VALLEY | CA | 93065 | USA | | |

| REC_ID | ORA... | SESSION_ID | SESSION_NAME_EXTENDED | TRACK_TYPE | SPEAKER_COMPANY | SESSION |
|---|---|---|---|---|---|---|
| 2 | 26708 | S292869 | OAUG TREASURY AND CASH MANAGEME... | FINANCIAL MA... | ERPIIS | 2007-11-1 |
| 3 | 26704 | S292904 | OAUG EDI SIG | ENTERPRISE M... | IBM | 2007-11-1 |
| 4 | 26657 | S292862 | OAUG UPGRADE AND SYSADMIN SIGS... | HIGH TECH | SOLUTION BEACON, LLC | 2007-11-1 |
| 5 | 26706 | S292883 | OAUG TUTOR / UPK SIG | HUMAN CAPIT... | BUSINESS AND DECISION | 2007-11-1 |
| 6 | 26705 | S292898 | OAUG TIME AND LABOR SIG | HUMAN CAPIT... | IDEAMETRICS LLC | 2007-11-1 |

| ATTEND_ID | SESSION_ID |
|---|---|
| W0861793 | S292904 |
| W0831791 | S292904 |
| W0876495 | S292904 |
| W0869858 | S292857 |
| W0802760 | S292857 |

PROJECTION MINING FOR ADVANCED RECOMMENDATION SYSTEMS AND DATA MINING

CROSS-REFERENCE TO RELATED APPLICATIONS

The application is a continuation of U.S. patent application Ser. No. 12/324,295, entitled Projection Mining For Advanced Recommendation Systems And Data Mining, filed by Pablo Tamayo, et al., on Nov. 26, 2008, which claims priority to Provisional Application No. 61/049,150 filed Apr. 30, 2008.

BACKGROUND OF THE INVENTION

1. Field of the Invention

The present invention relates to a method and system for creating and using data mining recommendation models that do not rely on having specific histories of activities, but which can establish relationships among data at a higher level of abstraction to create such models.

2. Description of the Related Art

The ability to generate quality recommendations for customers has been approached by numerous companies with a variety of approaches. However, these approaches generally assume that the products being recommended have a purchase or use history and a future, that is, they can be recommended for purchase or use in the future. Where products do not have a history, it is expected that proxies can be assigned to them until each product has its own history. Conventional approaches to recommendation systems assume that historical information is available or that those proxies are similar enough so that they can be used effectively as the basis of a predictive system. In cases where those conditions are not met the use of data mining and recommendations is much more limited or not easily applicable.

Similar challenges are encountered in other problems where the products are single use, for example, conference sessions. Conference sessions are normally available exactly once. The problem is how to recommend such sessions where there is no past history of their attendance, and no future instances of their delivery. The type of information that is available for such a problem involves, for example, past years' session, attendee, and session attendance data. However, this data is specific for sessions that were basically unique and do not repeat themselves from one year to the next. Similarly on the attendee's side, many people are new attendees every year and may not be well represented by other past attendees.

The crux of the problem is then how to leverage previous years' data where there is no direct proxy mapping for either sessions or attendees to generate session recommendations. In the more general case, the problem is how to make product recommendation models that are more general and represent relationships at a more abstract level that do not rely on having specific histories for the actual product or the customers, but can leverage past instances representing the acquisition, rating or attendance of other products by other customers.

SUMMARY OF THE INVENTION

Projection Mining provides a unified framework to address problems in recommendation systems and data mining, such as making product recommendation models that do not rely on having specific histories for the actual product or the customers, but can leverage past instances representing the acquisition, rating or attendance of other products by other customers, Projection Mining maps objects into attributes, and then maps these attributes into more abstract representations where the modeling takes place and the relationships between the objects can be better established. Projection Mining models are also more transparent and interpretable that traditional "black box" models and are easier to conceptualize. They fit better the intuitive notion of "matching" products to customers that most business users have in mind, rather than the more traditional data mining paradigms in terms of clustering or prediction. Many data mining problems are properly cast as classification or clustering but many require a combination of both in the context of structured and unstructured data. Projection mining allows for a unified approach combining both, which is more systematic, generalizable, and transparent than traditional data mining clustering/prediction or collaborative filtering.

A method for projection mining comprises performing a first projection on a first data object of a first type comprising a plurality of data entries and a second data object of a second type comprising a plurality of data entries to create definitions of attributes of the first data object and definitions of attributes of the second data object, performing a second projection of the definitions of the attributes of the first data object and the definitions of the attributes of the second data object into a space of meta-attributes based on semantic relationships among the attributes of the first data object and the second data object, learning relationships between the space of meta-attributes formed by the projections of the first data object and the second data object and a space of meta-attributes relating to new data not included in the first data object and the second data object, and generating at least one new data object of the first or second type based on the new data using the learned relationships. The relationships may be learned by using linear algebra, at least one matrix inversion, a linear algorithm, or generating a data mining model. The at least one new data object may be generated by using an inverse of the meta-attributes with the new data to map back to objects of the first and second types but containing the new data. The first projection performed on the first data object may be a different projection than the first projection that is performed on the second data object. The first projection may be an identity projection.

The first projection may be performed separately on a first data object and a second data object relating to a first data set and on a first data object and a second data object relating to a second data set. The first projection may create, for the first data set, definitions of attributes of the first data object comprising a first matrix T including correspondences of first objects and attributes of the first objects, and definitions of attributes of the second data object comprising a second matrix A including correspondences of second objects and attributes of the second objects, and for the second data set, definitions of attributes of the first data object comprising a first matrix T' including correspondences of first objects and attributes of the first objects, and definitions of attributes of the second data object comprising a second matrix A' including correspondences of second objects and attributes of the second objects. The first projection may comprise filtering at least some of the fields of the first data object and the second data object to include or exclude certain data or types of data based on filtering criteria, expanding categorical fields of low dimensionality, applying text mining to unstructured or high cardinality fields to produce structured document-term matrices, and integrating the results of the prior steps to form the first matrix T or T' and the second matrix A or A'.

The second projection may be performed using Principal Components Analysis, Independent Components Analysis, Matrix Decompositions, Vector Quantization, Non-Negative Matrix Factorization, or k-means clustering, self-organizing maps clustering, or other clustering methods that provide a soft-clustering or probabilistic output. When the second projection is performed using Non-Negative Matrix Factorization it may comprise factoring the first matrix T and the second matrix A to each form two matrices of lower rank and projecting the first matrix T' and the second matrix A' into the space of meta-attributes. The factoring may comprise factoring the first matrix T according to T~G×M, wherein matrix G includes correspondences of first objects and meta-attributes of the first objects, and matrix M includes correspondences of first objects and attributes of the first objects, and factoring the second matrix A according to A~W×H, wherein matrix W includes correspondences of second objects and meta-attributes of the second objects, and matrix H includes correspondences of second objects and attributes of the second objects. The projection may comprise projecting the first matrix T' according to $G'_T \sim T' \times M^{-1}$, wherein matrix $G'_T$ includes correspondences of first objects and meta-attributes of the first objects, and matrix $M^{-1}$ is a matrix pseudo-inverse of the matrix M, and projecting the second matrix A' according to $W'_A \sim A' \times H^{-1}$, wherein matrix $W'_A$ includes correspondences of second objects and meta-attributes of the second objects, and matrix $H^{-1}$ is a matrix pseudo-inverse of the matrix H.

The learning relationships may comprise creating a matrix S comprising correspondences between first objects and second objects for the first dataset and creating a matrix Z, according to $Z=G^T \times S \times W$, comprising correspondences between meta-attributes of the first objects and meta-attributes of the second objects for the first dataset.

Generating at least one new data object may comprise creating a matrix S', according to $S'=(G_T^T)^{-1} \times Z \times (W_A)^{-1}$, comprising correspondences between the first objects and the second objects for the second dataset. The relationships may be learned by generating a data mining model and generating at least one new data object may comprise generating recommendations using the data mining model. The recommendations may be generated by generating a set of scoring vectors using the data mining model, ranking the generated set of scoring vectors, and selecting at least a portion of the generated set of scoring vectors as the recommendations. The recommendations may be further generated by ranking the generated set of scoring vectors by comparing dot products of the vectors or using another comparison function and ordering the scoring vectors by sorting, filtering, or selecting vectors by class.

A method for automatically generating a conference schedule for an attendee of a conference comprises performing a first projection on data relating to sessions of least one conference and comprising a plurality of session data entries and on data relating to attendees at the at least one conference and comprising a plurality of data entries to create definitions of attributes of the sessions and definitions of attributes of the attendees, performing a second projection of the definitions of attributes of the sessions and definitions of attributes of the attendees into a space of meta-attributes based on semantic relationships among the attributes of the sessions and the attendees, learning relationships between the space of meta-attributes formed by the projections of the sessions and the attendees and a space of meta-attributes relating to new data relating to at least one new conference and including new data relating to a plurality of new sessions not included in the data relating to sessions and a plurality of new attendees not included in the data relating to attendees, generating a ranking of matches between new sessions and new attendees using the learned relationships, and generating a conference schedule of an attendee of the new conference using the ranking of matches between new sessions and new attendees.

The conference schedule may be generated by assigning sessions in the conference schedule of the attendee based on each highest ranked unassigned session for the attendee until the conference schedule of the attendee is full or partially full and skipping or assigning as backup sessions a lower ranked unassigned session occurring at the same time as an assigned session. The method may further comprise assigning session based on spatial proximity of sessions so as to satisfy distance or time constraints between sessions.

BRIEF DESCRIPTION OF THE DRAWINGS

The details of the present invention, both as to its structure and operation, can best be understood by referring to the accompanying drawings, in which like reference numbers and designations refer to like elements.

FIG. 1 is an exemplary diagram of an attendee attribute matrix T.

FIG. 2 is an exemplary diagram of a session attribute matrix A.

FIG. 3 is an exemplary diagram of a matrix S correlating attendees with sessions attended.

FIG. 8 is an exemplary diagram data flow diagram schematically summarizing the process shown in FIG. 7.

DETAILED DESCRIPTION OF THE INVENTION

Figure 4:
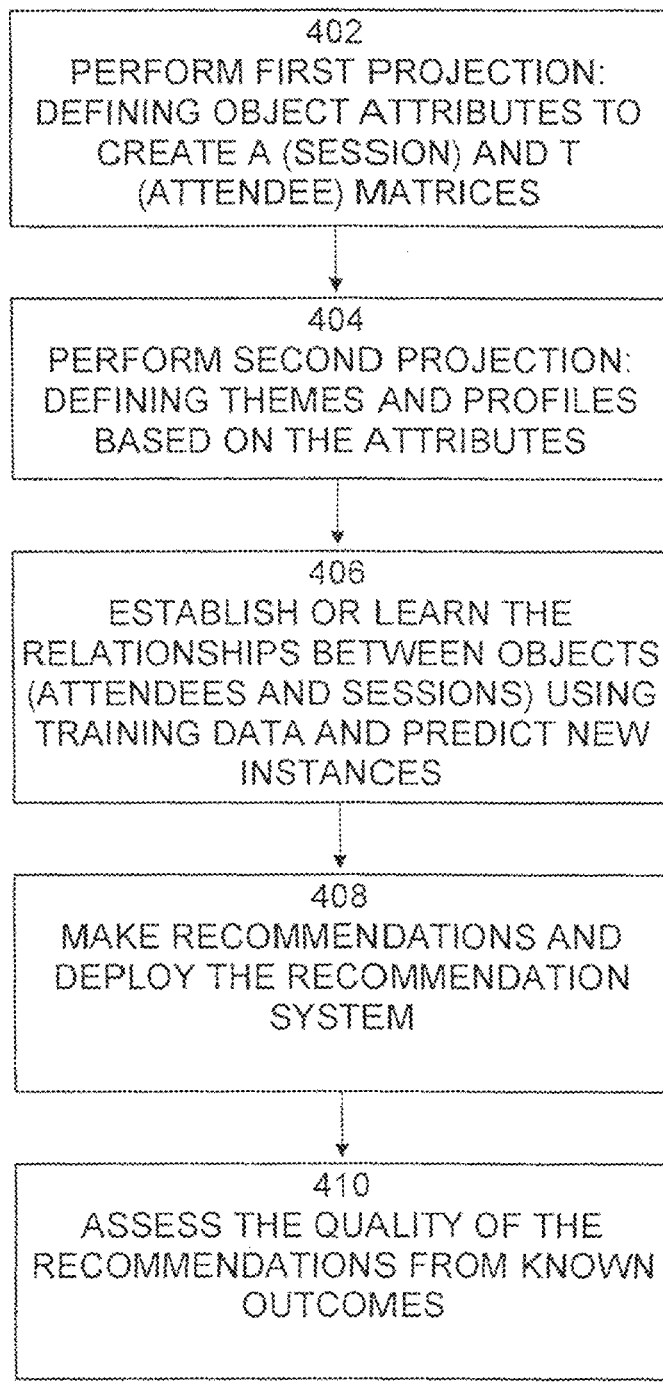
FIG. 4 is an exemplary flow diagram of a process of Projection Mining.

Projection Mining (PM) provides an effective solution to the recommendation problems described above, but is also of much more general applicability. Projection mining makes the basic assumption that it is advantageous to "map" or "project" the input objects (documents, sessions, attendees, customers) into a space of characteristic attributes, and then further project these into a more abstract space of meta-attributes (e.g. attendee "profiles" or session "themes") of lower dimensionality. Once the data has been projected into attributes or meta-attributes it is easier and more effective to create and train explicit predictive models to establish and learn their relationships (e.g. session attendance, product acceptance or acquisition, ratings, etc.); and use those in turn to predict, forecast or provide future recommendations.

The ability of such models to generalize comes first from the definition of relevant attributes that describe the entities (e.g., customer or attendee job descriptions or demographics, topics and tracks for sessions, etc.) in a structured manner. This is termed the first projection of the data and is typically applicable to deal with content instead of objects (e.g., documents, ads, news) or to generalize customer preferences (e.g., color, size, shape, style).

In addition to the use of attributes as a means of representation, Projection Mining incorporates a second projection of attributes into an abstract space of meta-attributes such as themes and profiles, that allows for better abstraction and generalization of semantic features by mapping the attributes into a space where their most relevant combinations are emphasized and noise and idiosyncrasies are reduced at the same time. This second projection is similar to the latent semantic representations typically used in the context of information retrieval of documents or text mining.

One important strength of the Projection Mining paradigm comes from the systematic use of "dual" projections, from objects to attributes, and then from attributes to meta-attributes, applied in parallel on both input data types: products/session and customer/attendees. Besides the data projections, the Projection Mining general framework also includes the learning of a transformation between the original or transformed spaces using linear or non-linear methods and measuring similarity between the transformed object (e.g., attendee or customer) and the target objects (e.g., product or sessions) in a number of different ways. This combined with the learning of relationships provides indeed a very general and powerful framework for modeling recommendation systems, which has enormous flexibility and generality, and encompasses many other approaches as special cases. The different methodological components of this framework have been used before in different contexts but the framing of the approach in a unified and integrated methodology is unique to this proposal.

It is important to notice that the availability and modeling of attributes instead of proxies eliminates many limitations of collaborative filtering approaches and allows the methodology to work with samples of the data. Because the modeling is done at a higher level of abstraction (attributes or meta-attributes), it makes the models more effective to represent invariant or semantic features, and is consequently less idiosyncratic to specific training instances and more generalizable to new situations such as in the case of future recommendations (e.g. session to attendees or future products to new or existing customers, etc). The Projection Mining paradigm defines a complete methodology that includes data preparation, attribute definition, decomposition, model creation, model deployment and appropriate performance metrics based on non-parametric statistics as will be described in the rest of this document.

An example of Projection Mining involving generating recommendations for conference session attendees is described below. An example of a definition of this conference recommendation problem is shown in FIGS. 1, 2, and 3 in terms of 3 matrices.

The matrix shown in FIG. 1, Matrix T 100 defines correspondences of attendee vs. attendee attributes. Matrix 100 may be termed the attendee characterization matrix. The attributes are the information captured at registration time (e.g., job/position, interests, industry, etc.). In the example shown in FIG. 1, the input table containing registration for an attendee includes attributes such as Registration ID, Registration Date, Job Title, Registration Tier, Address information, etc.

The matrix shown in FIG. 2, Matrix A 200 defines correspondences of sessions vs. sessions attributes. Matrix 200 may be termed the session characterization matrix. In the example shown in FIG. 1, the input table characterizing a session includes session features, such as keywords, primary and secondary track etc.

The matrix shown in FIG. 3, Matrix S 300 defines entries representing the sessions that each attendee attended. These are instances of "matches" i.e. relevant relationships between the row entries in matrices A 200 and T 100. In this example, inclusion of entries in matrix S 300 indicates attendance of an attendee at a session. Matrix S 300 may also be a binary matrix wherein 1 equals attendance, and 0 equals no attendance. Matrix S 300 may be computed directly from attendance data. In a more general case, matrix S may contain not only binary entries but also continuous or ordinal entries that correspond to session (product) ratings or grades.

Using the example of a conference recommendation setting, the Projection Mining approach defines a procedure that takes the attendee and session input training data, and also new instances of attendees and sessions, and produces predicted matches or scores of "new" attendees vs. "new" sessions. Special cases of this paradigm are, for example, recommending existing sessions to new attendees, or "cross-selling": recommending new sessions to existing attendees. The general case is matching new sessions to new attendees.

Figure 5:
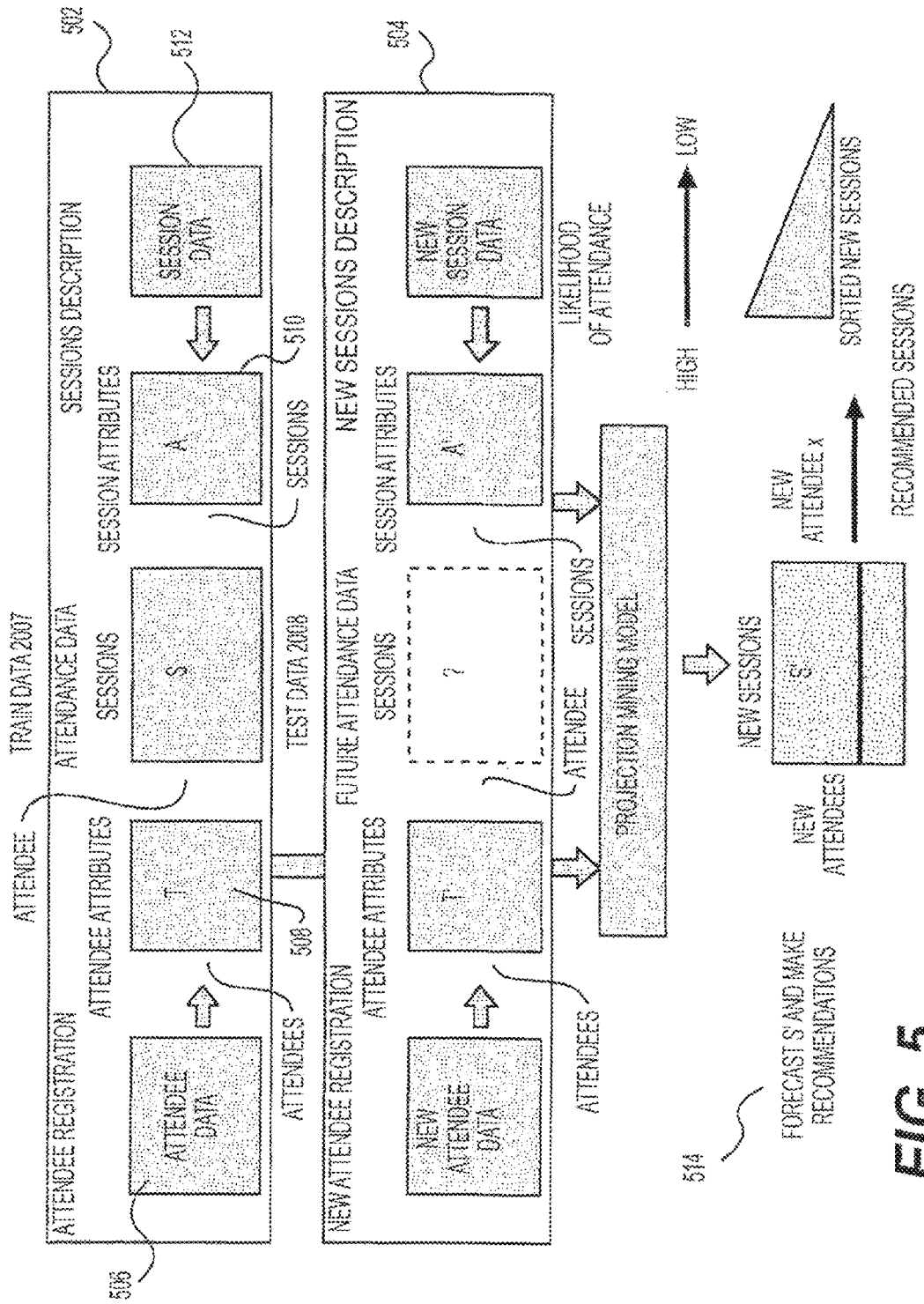
FIG. 5 is an exemplary data flow diagram schematically summarizing the process shown in FIG. 4.

An exemplary flow diagram of a process 400 of Projection Mining is shown in FIG. 4. It is best viewed in conjunction with FIG. 5, which is a data flow diagram schematically summarizing the process. Process 400 begins with step 402, in which the First Projection is performed by defining object attributes to create A (session) and T (attendee) matrices. For example, attendee data 506 is processed to define attendee attributes matrix T 508 and session data 510 is processed to define session attributes matrix A 512. In step 404, the Second Projection is performed by defining themes and profiles based on the attributes. In step 406, the relationships between objects (attendees and sessions) is established or learned using training data, and new instances are predicted. In step 408, recommendations 514 are made and the recommendation system is deployed. In step 410, the quality of the recommendations is assessed from known outcomes 504.

Figure 6:
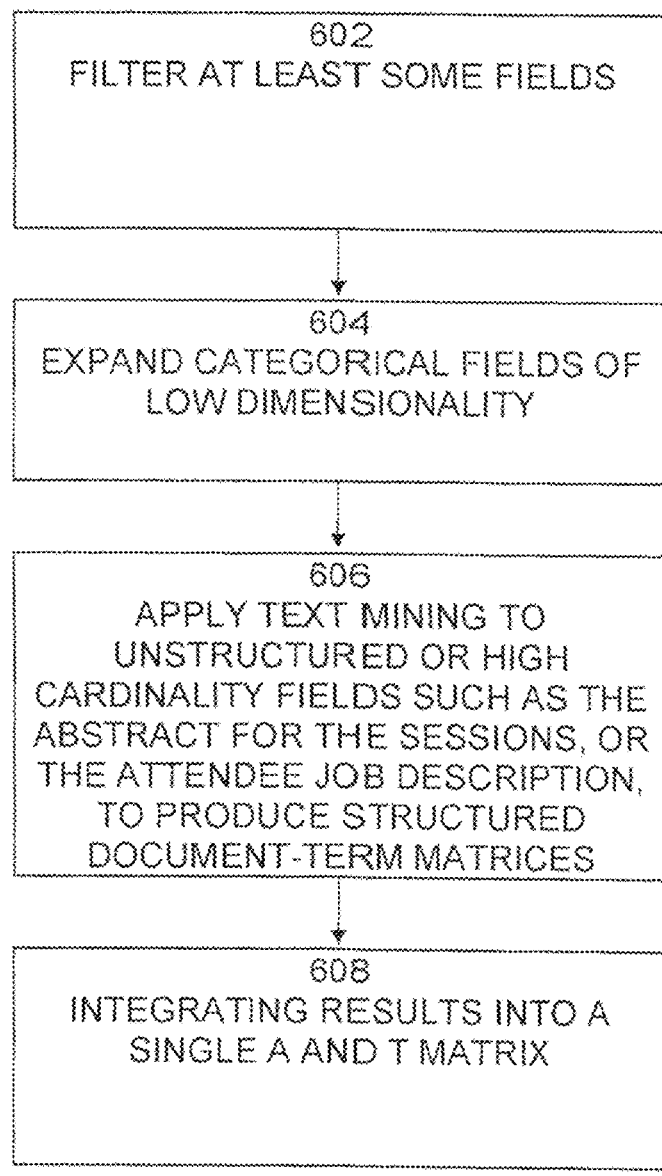
FIG. 6 is an exemplary flow diagram of processing involved in performing first projection processing.

An exemplary flow diagram of processing 600 involved in performing first projection step 402 of FIG. 4 is shown in FIG. 6. In the first projection, object attributes are defined to create matrices A 510 and T 508. The tables that represent attendee 506 and session 512 data incorporate different types of fields including categorical, numerical, and free text (e.g. abstracts). In steps 602-606, matrices A 510 and T 508 are obtained from these tables by pre-processing them to produce structured tables. In step 602, at least some of the fields of the tables are filtered to include or exclude certain data or types of data based on filtering criteria. In step 604, categorical fields of low dimensionality are expanded. In step 606, text mining is applied to unstructured or high cardinality fields such as the abstract for the sessions, or the attendee job description, to produce structured document-term matrices. In step 608, the results of the pre-processing steps are integrated into a single A matrix 510 and a single T matrix 508.

The use of attributes for representing a combination of structured and unstructured fields is something that is well understood in the recommendation domain. As described in the introduction it has been applied to deal with content instead of objects or to generalize customer preferences and is an alternative to the use of "proxies," "mentors" or "nearest-neighbors."

Figure 7:
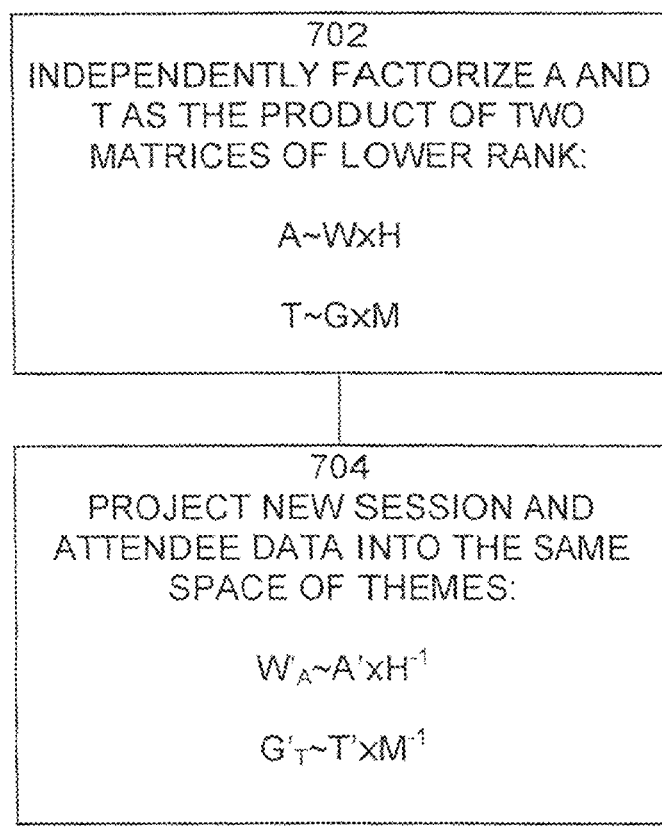
FIG. 7 is an exemplary flow diagram of processing involved in performing second projection processing.

An exemplary flow diagram of processing 700 involved in performing second projection step 404 of FIG. 4 is shown in FIG. 7. To perform the second projection, the data matrices A and T are projected into a new basis or space of "meta-attributes" where we can model the relationships implied by S instead of the original space. The advantage is that once the semantic relationships are exposed we can better extrapolate to cases with new customers and new products, not included in S, and "predict" or "forecast" a matrix S' that can be used for recommendations. In the context of the Projection Mining approach this projection can be accomplished with a variety of methods including, for example, Principal Components Analysis (PCA), Independent Components Analysis (ICA), Matrix Decompositions, Vector Quantization, and clustering methods that provide a soft-clustering or probabilistic output (e.g. k-means, self-organizing maps etc.). The example shown in FIG. 7 uses Non-Negative Matrix Factorization (NMF). In this approach, A and T are independently factorized as the product of two matrices of lower rank:

$$A \sim W \times H, \text{ and } T \sim G \times M.$$

Figure 8:
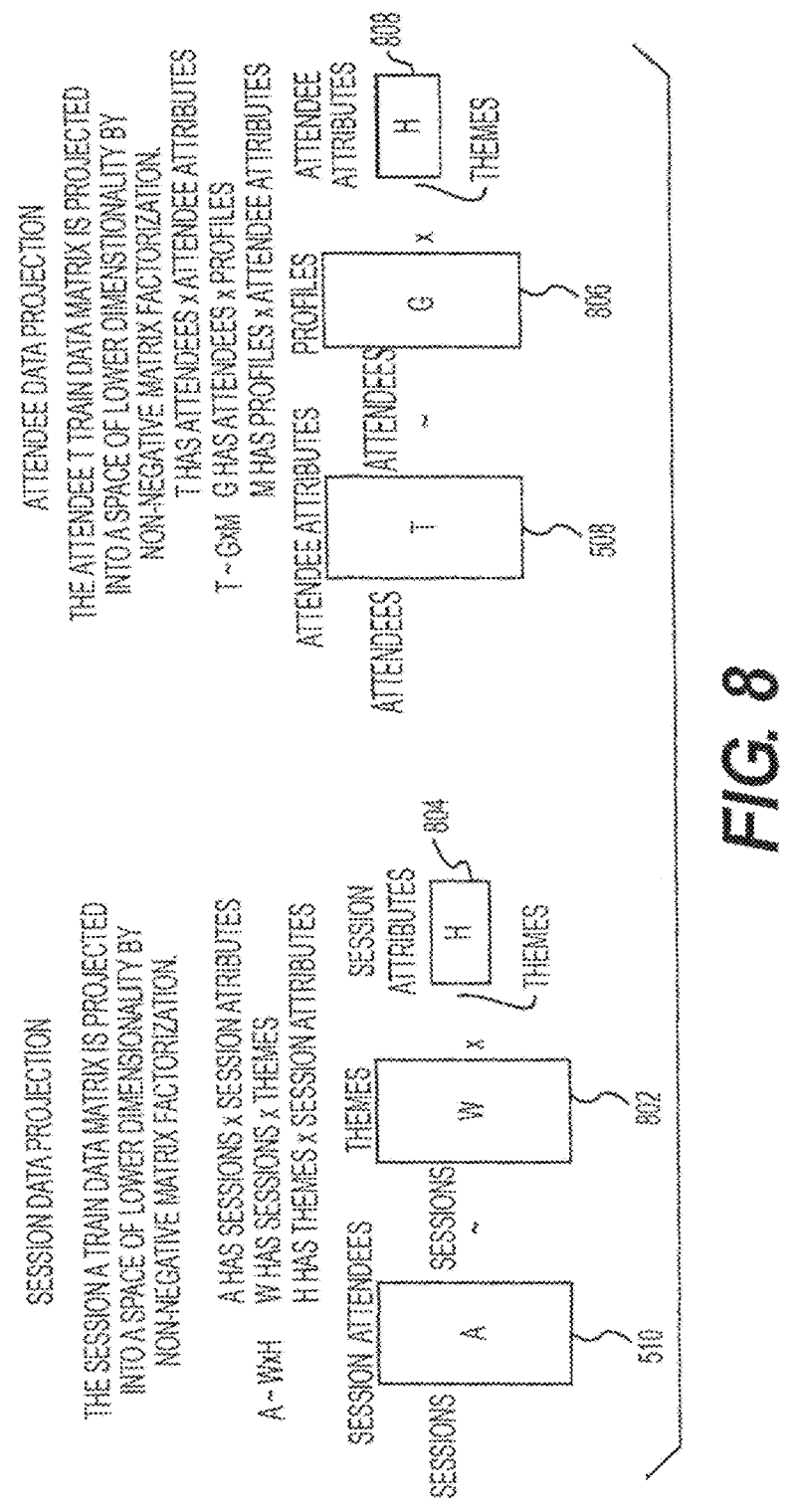

As shown schematically in FIG. 8, matrix A 510 is approximated by W 802×H 804, where W 802 is a matrix that has sessions vs. session meta-attributes (called from now on "session themes"), and matrix H 804 has session themes vs. session attributes. Matrix T 508 is approximated by G 806×M 808, where G 806 has attendees vs. attendee meta-attributes (called from now on "attendee profiles"), and matrix M 808 has attendee profiles vs. attendee attributes. This Dual Matrix Decomposition (DMD) produces sparse projections that can be interpreted as additive decompositions of the original data by parts or components.

Once A 510 and T 508, the training data, have been projected into W 802×H 804, and G 806×M 808, new session and attendee data can also be projected into the same space of themes and profiles by:

$$W'_A \sim A' \times H^{-1}, \text{ and } G'_T \sim T' \times M^{-1},$$

where $[\cdot]^{-1}$ is the matrix pseudo-inverse. When different approaches to the second projection are used (e.g. PCA, k-means) appropriate methods to map new instances to the space of the training data must be used (e.g., "loading" coefficients for PCA and clustering new data into existing centroids for k-means).

Figure 9:
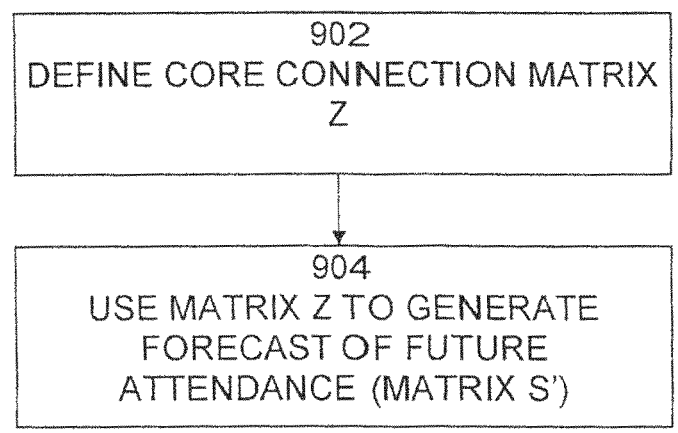
FIG. 9 is an exemplary flow diagram of processing involved in performing learning processing.

An exemplary flow diagram of processing 900 involved in performing learning step 406 of FIG. 4 is shown in FIG. 9. In step 902, when all the available input data (A & A' and T & T') has been projected, the attendance matrix S (attendees vs. sessions), which represents the attendance from the past, can be used to define a core connector matrix Z, which represents the relationships between themes and profiles induced by the entries of S. For example, a simple way to accomplish that is to multiply S by the projected data so that the relationships can be exposed:

$$Z = G^T \times S \times W.$$

The matrix Z summarizes and generalizes the relationships between attributes and sessions at an abstract level. The connections represented by Z are more general and more likely to be invariant because they are established in the semantic t space of session themes and attendee profiles. Then in step 904, the Z matrix is used to generate a forecast of future attendances (matrix S') that matches new attendees with new sessions. To do so, one first projects the new sessions A' and attendees T' data and then compute S' by using Z.

$$S' = (G_T^T)^{-1} \times Z \times (W_A)^{-1}$$

In terms of A' and T' this is:

$$S' = (M \times T'^{-1})^T \times Z \times H \times A'^{-1},$$

where the "training" of the model takes place by the projections of the training data to find W, H, G and M and in the computation of Z. Besides this direct linear matrix computation of Z, under the most general version of the approach, the learning of the relationships between profiles and themes, or the original attributes, can be accomplished by a general classification or regression algorithm trained on the instances from S. For example, a mapping function F, such as a Naïve Bayes or Support Vector Machine (SVM) model, can map original attributes into session themes that are then matched to the new sessions to compute scores for each new attendee and new session (S'), according to:

$$S' = F(G_T) \times (W'_A)^{-1}.$$

In this case F, e.g., can be trained with the training attendance data. The paradigm described before is a special case of this approach where F is just the linear transformation of S:

$$F(G) = Z = G^T \times S \times W.$$

Alternative approaches can be developed where F is learned from the first projection directly. For example, starting from the expression for S' in terms of the attendee attributes:

$$S' = (T'^T)^{-1} \times M^T \times G^T \times S \times W \times W'_A^{-1}.$$

F is trained directly on the attendee attributes to map them into themes and the final recommendations are the matching of those with the new sessions (W'A):

$$S' = F(T') \times W'_A^{-1} \text{ or } S' = F(T') \times W'_A^T.$$

Or alternatively F can map all the way into session attributes:

$$S' = F(T') \times A'^T.$$

In this case there is no second projection into themes and profiles and the method maps directly attendee attributes into vectors of session attributes that are then matched against actual sessions (for example by F(T')×A'T) for every attendee. Finally, another special case will be one in which F maps attendee profiles directly into session attributes:

$$S' = F(G') \times A'^T.$$

Where the second projection is done only on attendees but not for sessions.

Figure 10:
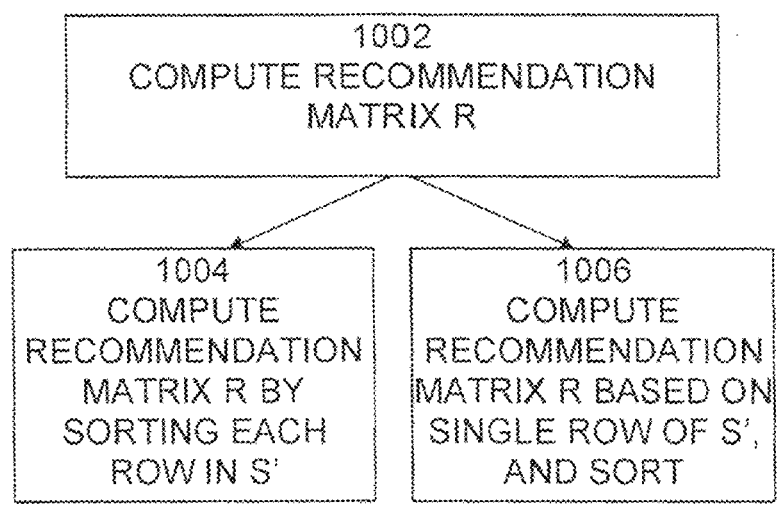
FIG. 10 is an exemplary flow diagram of processing involved in performing recommendation generating and deployment of a recommendation system.
Figure 11:
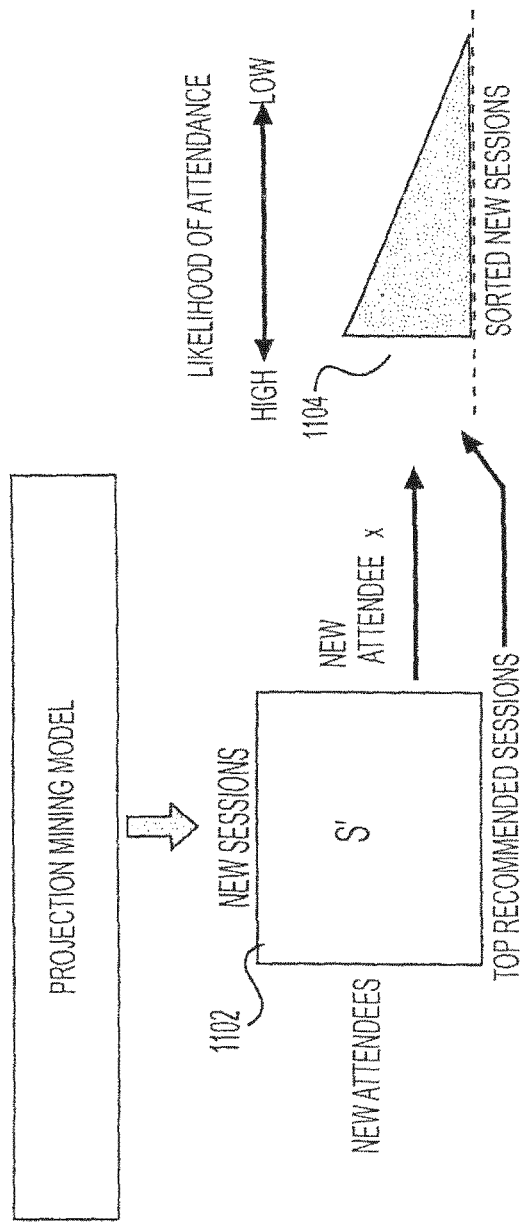
FIG. 11 is an exemplary schematic data flow diagram of Projection Mining recommendation and deployment.

An exemplary flow diagram of processing 1000 involved in performing recommendation and deploying step 408 of FIG. 4 is shown in FIG. 10. It is best viewed in conjunction with FIG. 11, which is a schematic data flow diagram of Projection Mining recommendation and deployment. Matrix S' ranks the new sessions for each new attendee and provides recommendations based on the amount of similarity, as was defined by S in the training set, between the attendee's profiles and the sessions' themes. In step 1002, a recommendation matrix R 1104 is computed. There are a number of ways to do this. For Example, in step 1004, based on matrix S' 1102, a recommendation matrix R 1104 is computed by just sorting each row of S' in decreasing order and making recommendations for sessions with high scores (leftmost):

$$R_i = \underset{j}{\text{sort}}(S_i).$$

For example, if we use the linear algebra approach of computing Z, it can then be used to estimate a test attendance matrix S' based on A, A', T, T' and S according to:

$$S'=(M\times T'^{-1})\times Z\times H\times A'^{-1}=(T'^T)^{-1}\times M^T\times Z\times H\times A'^{-1}.$$

However, in some cases, in step 1006, e.g. web page-based recommendation, the deployment scenario will require that the recommendations be computed on a single row of S', i.e., on a single attendee at conference registration time. Then, the relevant recommendation scores are those in a single row of S':

$$S'_i = (T'^T_i)^{-1}\times(M^T\times Z\times H\times A'^{-1}) = (T'^T_i)^{-1}\times\Omega = T'_i I\|T'_i\|^2\times\Omega,$$

$$R_i = \operatorname*{sort}_i(S_i).$$

Then the recommendations for an attendee can be computed simply as sorting the result of a vector-matrix multiply of the normalized vector of attendee attributes $(T'_i I\|T'_i\|^2)$ times a matrix $\Omega$, the product of $(M^T\times Z\times H\times A'^{-1})$, which can be pre-computed in advance at training time. This "per attendee" scoring can be performed fast in real time on the deployment side using SQL queries in a few seconds of CPU time.

Similar deployment schemes can be implemented when other more general machine learning algorithms are used to map attributes or meta-attributes and then map the predictions to actual sessions. For example $$S'_i = F(T'_i)\times W'^T_A,$$

$$R_i = \operatorname*{sort}_i(S_i).$$

Where scoring a single attendee record by model F is typically accomplished at high speed the same way as when scoring is done record-by-record in data mining.

Context-dependent recommendations may be generated. One other advantage of this approach is that at deployment time it produces an entire vector of recommendations $R_i$ that can be used in a context-dependent way in the deployment environment. For example, if a new attendee just finished registration and is starting to schedule sessions for track x, using the corresponding track x listing or web page, the Prediction Mining Recommendation System can select on the fly, from the recommendation vector $R_1$, a subset of relevant recommendations that belong to that specific track. Similarly, if the attendee is looking at Wednesday morning sessions the system can recommend the best choices for that specific time slot based on the top scoring recommendation fitting that time slot.

Partial test data may be incorporated in the model. If one had new attendees for an existing set of sessions one can make recommendations by a partial attend-test model:

$$S'_{new\_attendees,old\_sessions}=(G'^T)^{-1}\times Z\times W^{-1}.$$

In a similar way if one had new sessions to be recommended to the old attendees' one can use a partial session-test model:

$$S'_{old\_attendees,new\_sessions}=(G'^T)^{-1}\times Z\times W^{-1}.$$

It is also possible to merge attendance data from a subset of sessions that have already taken place in the current conference (e.g. this year) with the past year to produce potentially better recommendations:

$$Z_{comb}=\alpha Z_{last\_year}+(1-\alpha)Z_{this\_year}, S'=(G'^T)^{-1}\times Z_{comb}\times(W')^{-1}.$$

Where $\alpha$ is the proportion or weight given to last year vs. this year. Then the computation of S' and the recommendations are obtained as before. This "mixture" model approach allows for other potential applications where the consolidation of models might be necessary or desirable.

Figure 12:
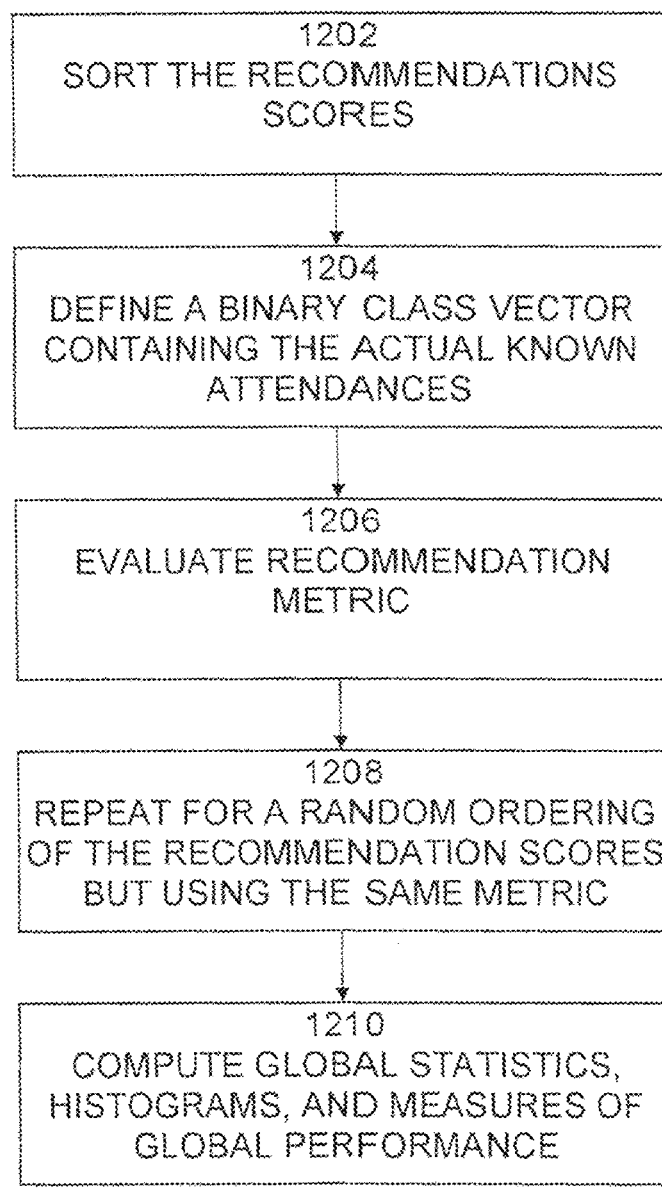
FIG. 12 is an exemplary flow diagram of processing involved in performing recommendation quality assessment.

For test data S' where the attendance is known, e.g., a hold-out sample of the training data, one can measure the performance of the Projection Mining system by using a suitable recommendation metric or statistic. To accomplish this for each new attendee t' in S' attending at least a minimum number of sessions (e.g., 5) the process shown in FIG. 12, which is an exemplary flow diagram of processing 1200 involved in performing recommendation quality assessing step 410 of FIG. 4, may be performed. In. step 1202, the recommendations scores (corresponding row of $R_i$) is sorted from high to low. In step 1204, a binary class vector containing the actual known attendances $S_i'$ is defined. The actual attendances $\{S'=1\}$ are considered as "hits" and the non-attendances $\{S'=0\}$ as "misses". In step 1206, a recommendation metric is evaluated as a function of both: model ranking/scores, and the known attendances $S_i'$ class vector. In step 1208, the recommendation metric evaluation computation is repeated for a random ordering of the recommendation scores but using the same metric. These values are used to define a "null" distribution of scores and to assess the statistical significance of the value using the actual ordering induced by the model scores. In step 1210, once this is done for every attendee attending at least a minimum number of sessions, global statistics, histograms, and measures of global performance are computed.

This procedure can easily be implemented once a recommendation metric has been chosen. Traditional metrics such as the Area under the ROC (AUC-ROC) or the Recommendation. Lift can be used in principle. The area under the ROC measures the effectiveness of the recommendation system in terms of how well the ranking induced by the model score predicts the attendance vector. The recommendation lift is the fraction of hits in the top x percentile segment of the recommendation vector $R_i$ compared with the same number in a random ordering of the sessions. The recommendation lift decreases as the x percentile segment chosen is a larger fraction of the total set of sessions. When the entire set of sessions is considered, i.e., x is 100%, the value of the recommendation lift is 1. A random recommender will get a lift near 1 regardless of the percentile chosen. The recommendation lift therefore answers the question: How much better is the recommendation system when one considers the top x recommendations compared with a random recommender.

These two metrics are often used to assess the performance of classification and recommendation systems. However, there is one problem that makes their use more limited in the context of the conference recommendation problem. It is common that the actual attendance for a given attendee represents only a small subset of the universe of potentially interesting sessions and as a consequence a good recommendation model may be over-penalized. For example if an attendee is interested in attending 12 sessions but due to time constraints, scheduling conflicts and other circumstances ends up attending only 5 sessions, a recommendation model that ranks those 10 sessions higher, than the actual 5 attended ones, will be duly over-penalized. If the threshold used for the recommendation lift is high and the hits are below it, then the lift will be quite bad, not reflecting the fact that the model might be actually quite good. This problem makes the score very sensitive to the location of the threshold. The area under the ROC avoids the problem in part because it considers the global ranking of recommendations and not only the top; however it still over penalizes that situation because every "miss" decreases the overall score. One more rational way to deal with this problem is to assess performance by considering the overall global ranking of hits (such as the Area under the ROC) while giving more weight to recommendations where the model score is higher (such as the recommendation lift) but at the same time without over-penalizing a model for having "misses" near the top of the list. This can be accomplished by using a modified Kolmogorov-Smirnov statistic that is weighted by the model score. This rather agnostic quantity measures the amount of "enrichment" of hits in the ranking induced by the recommendation system. As this is currently our main performance measure for the conference recommendation problem, and is novel in terms of performance measures for recommendation systems, we will describe how it is computed in some detail.

The original Kolmogorov-Smirnov statistic measures the difference between two probability distributions, in this case the distribution of hits ({S'=1} "hits") and the distribution of "misses" ({S'=0} "misses"), by the maximum difference (supremum) between them. Then, for attendee k enrichment score $E_k$ can be computed as a function of the model ranking/scores, and the known attendances Si' class vector:

$$E_k = \sup_i (P_{hit}(i) - P_{miss}(i)) = \sum_{a_j \in \{S'=1\} \& j \leq i} \frac{|R_k(j)|}{\sum_{a_j \in \{S'=1\}} |R_k(j)|} - \sum_{a_j \in \{S'=0\} \& j \leq i} \frac{1}{(N-H)}.$$

This quantity is confined to the [−1, 1] interval. The "i" is a running index from the top to the bottom of the recommendation list as sorted by the model score, $R_j$. Besides being used for ranking, these model scores are also used as "weights" (first summation in the equation above) in order to make differences at the top of the list more significant (but not as much as in the recommendation lift). N is the length of the session list and H is the number of actual attendances (hits).

Figure 13:
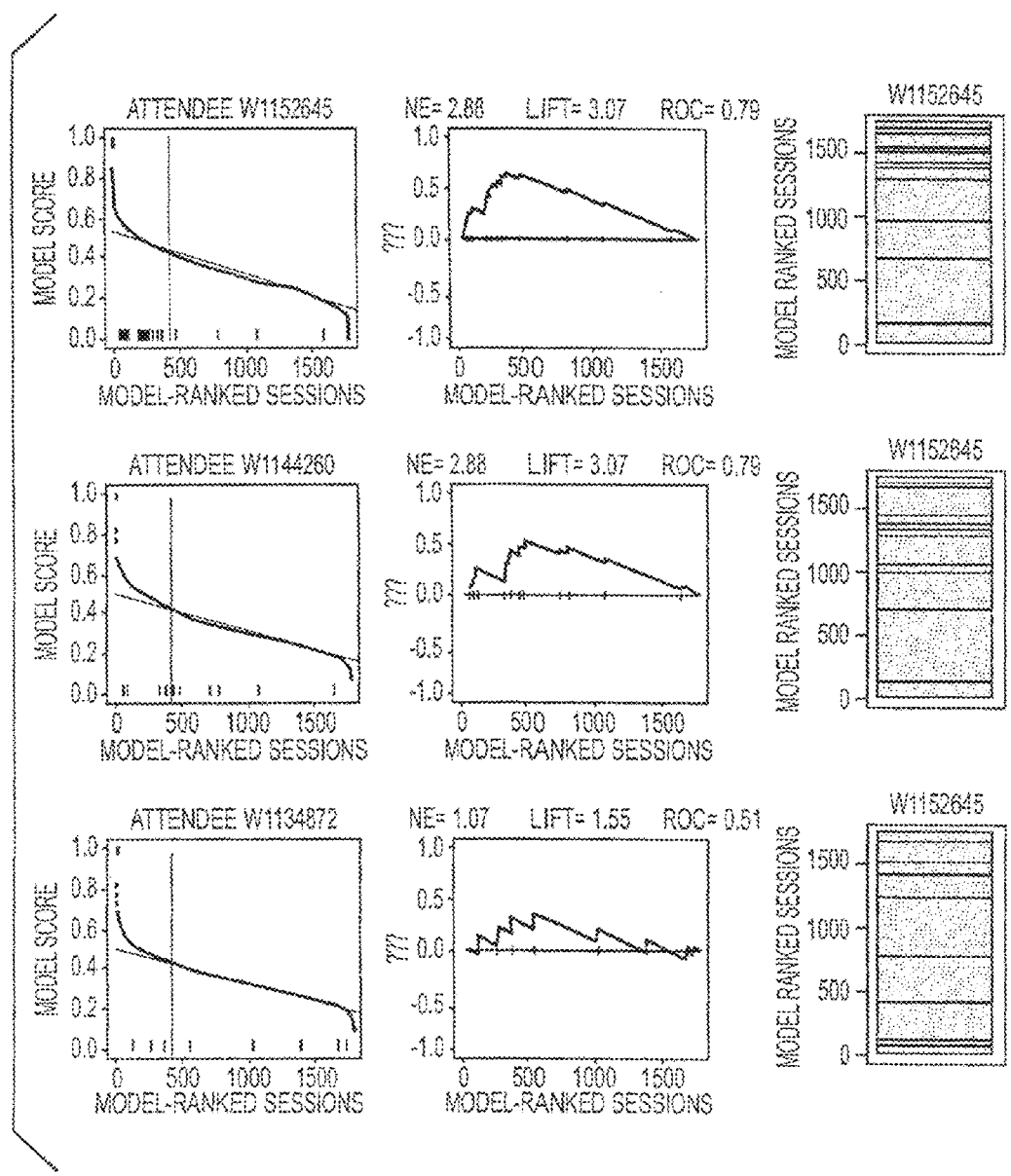
FIG. 13 is an exemplary diagram illustrating examples of recommendation scoring and calculation of associated values.

Three real examples of recommendation scores and the running calculation of the $E_k$ score are shown in FIG. 13. The three examples represent from top to bottom an excellent, a good, and a random-like recommendation. The distribution of model scores usually decreases at a steep rate until it settles to a more linear behavior that extends for most of the sorted recommendation list. We used a simple linear model to fit the data (green line) and define a threshold to divide the recommendations between high and low confidence (vertical green line). This threshold and the categorization of model predictions as high or low are particularly useful when deploying the model. The blue lines represent the location of each hit (actual attended session). The "enrichment" score provides an evaluation of the quality of recommendation for each attendee in the test set. The normalized enrichment scores are 2.88, 1.63 and 1.07 respectively. Random recommendations will attain on average an enrichment score of 1. The left panels show the model scores as a function of rank. The green lines show the linear behavior of the recommendations and the threshold defined to separate high from low confidence recommendations. The blue lines represent the locations of the hits. The middle panels show the running calculation in the equation above where the enrichment score is the maximum deviation from zero. The right panels show the model-ranked recommendations as a vertical list with the best on top and the worse at the bottom. Here the model scores are indicated with a red-blue heatmap.

In addition to this enrichment score for every attendee, a number of random $E^R_k$ scores are computed by performing the same computation, but randomizing the location of the actual attendances (hits). This allows us to assess the statistical significance of any attendee's enrichment score (e.g., computing a nominal p-value), but also provides a way to normalize the $E_k$ scores, which are slightly different for each attendee because the number of hits is different. The normalization can be achieved by dividing the $E_k$ score by the mean of the random scores for the same attendee:

$NE_k = E_k / \text{mean}(\{E_k^R\})$.

This rescaling normalization works well empirically and is motivated by the linear dependency on the number of hits in the analytical approximation to the Kolmogorov-Smirnov distribution.

For problems such as the conference recommendations problem we use this modified Kolmogorov-Smirnov metric as the main quantitative measure to evaluate a model's performance. For other applications this metric plus the area under the ROC and the recommendation lift could all be equally suitable and should be considered.

Figure 14:
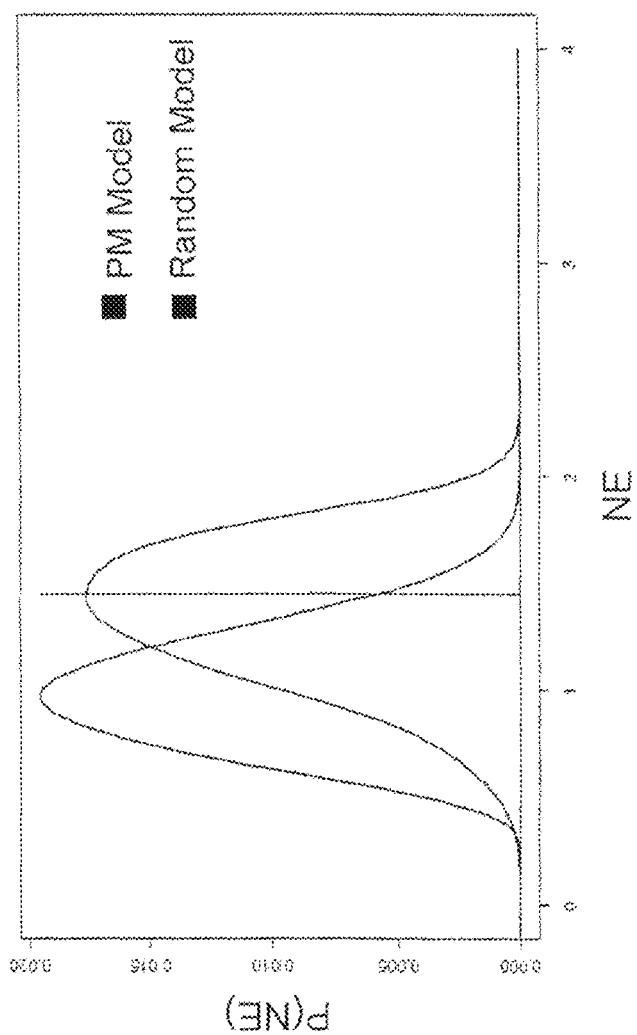
FIG. 14 is an exemplary diagram illustrating an example of a global measure of merit a test set.

A global measure of merit for the entire test set can be computed by making a histogram using the individual attendees ES scores, as shown in FIG. 14.

Figure 15:
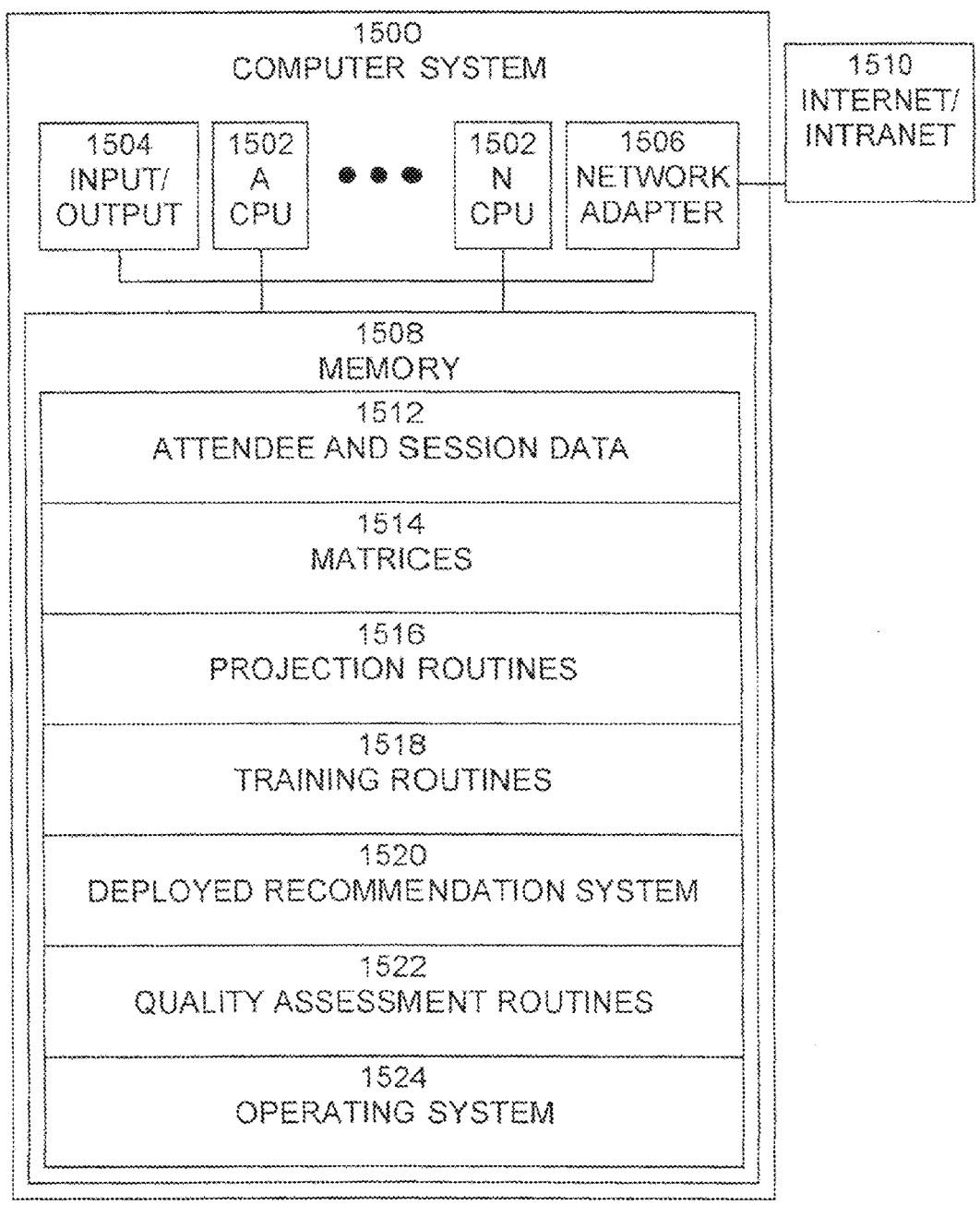
FIG. 15 is an exemplary block diagram of a computer system in which the present invention may be implemented.

An exemplary block diagram of a computer system 1500, such as a database management and/or data mining system, is shown in FIG. 15. System 1500 is typically a programmed general-purpose computer system, such as a personal computer, workstation, server system, and minicomputer or mainframe computer. System 1500 includes one or more processors (CPUs) 1502A-1502N, input/output circuitry 1504, network adapter 1506, and memory 1508. CPUs 1502A-1502N execute program instructions in order to carry out the functions of the present invention. Typically, CPUs 1502A-1502N are one or more microprocessors, such as an INTEL PENTIUM® processor. FIG. 15 illustrates an embodiment in which System 1500 is implemented as a single multi-processor computer system, in which multiple processors 1502A-1502N share system resources, such as memory 1508, input/output circuitry 1504, and network adapter 1506. However, the present invention also contemplates embodiments in which system 1500 is implemented as a plurality of networked computer systems, which may be single-processor computer systems, multi-processor computer systems, or a mix thereof.

Input/output circuitry 1504 provides the capability to input data to, or output data from, database/system 1500. For example, input/output circuitry may include input devices, such as keyboards, mice, touchpads, trackballs, scanners, etc., output devices, such as video adapters, monitors, printers, etc., and input/output devices, such as, modems, etc. Bearer network adapter 1506 interfaces device 1500 with a plurality of bearer networks 1510A-N. Bearer networks 1510A-N may be any standard point-to-point bearer network or WLAN, such as GSM, CPRS, EV-DO, WiMAX, LTE, WiFi, CDMA, etc., a broadcast or multicast bearer network such as MediaFLO™, DVB-H, DMB, WiMAX MBS, MBMS, BCMCS, etc., or a private or proprietary bearer network.

Memory 1508 stores program instructions that are executed by, and data that are used and processed by, CPU 1502 to perform the functions of system 1500. Memory 1508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 1508 varies depending upon the function that system 1500 is programmed to perform. In the example shown in FIG. 15, memory 1508 includes attendee and session data 1512, matrices 1514, projection routines 1516, training routines 1518, deployed recommendation system 1520, quality assessment routines 1522, and operating system 1524. Attendee and session data 1512 include data relating to attendees, such attendee ID, job/position, interests, industry, etc, and data relating to sessions, such as title, subject, presenter, date, time, length, etc. Matrices 1514 include matrices computed from attendee and session data 1512, such as matrices A and T, and matrices computed from other matrices, such as matrices S, S', Z, W', etc. Projection routines 1516 are software routines that perform the first projection of using attendee and session data 1512 to define object attributes to create a (session) and t (attendee) matrices, as shown in step 402 of FIG. 4, and the second projection of defining themes and profiles based on the attribute matrices, as shown in step 404 of FIG. 4. Training routines 1518 are software routines that establish or learn the relationships between objects (attendees and sessions) using training data and predict new instances, as shown in step 406 of FIG. 4. Deployed recommendation system 1520 is a software system that has been deployed to make recommendations using the relationships between objects learned by training routines 1518, as shown in step 408 of FIG. 4. Quality assessment routines 1522 assess the quality of the recommendations made by deployed recommendation system 1520 from known outcomes, as shown in step 410 of FIG. 4. Operating system 1524 provides overall system functionality.

As shown in FIG. 15, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

By projecting datasets into lower-dimensional matrix representations it reduces the noise and emphasizes salient features in the data. Once products, customers, etc. are projected in a suitable space of representation, their relationships can be modeled much more easily and efficiently. As most operations in Projection Mining are matrix operations between tables of data or use data milling models, the paradigm fits very well with the RDBMS environment. In addition Projection mining models provide advantages such as:

- Provide generalizability and abstraction: the original data matrices characterizing sessions and attendees are projected into a space defined by attributes or combinations of attributes.
- Facilitate multiple tables relationship modeling
- Models are tables that are relatively transparent, sparse and can easily be interpreted.
- Reduce noise and idiosyncrasies and exposes the most salient structure of the data i.e. the regularities implicit in session, attendee and attendance matrices
- Optimize the modeling at the desired level of resolution, e.g., the number of attributes or components: themes or profiles.
- Are not limited by the need of finding close proxies, mentors, or nearest-neighbors for each test record in the past data as the connection between sessions and attendees is done at the abstract level of theme and profiles.
- Can extrapolate to the future and provide effective recommendations for products for which there is no history or are sold only once.
- Projection mining models are easily deployable and can be used in on-the-fly context-dependent scenarios where most of the computational work can be done in advance (at training time) and the scoring is simplified to a vector-matrix multiply and a vector sort or by single-record scoring using a pre-trained data mining model.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media, examples of which include, but are not limited to, floppy disks, hard disk drives, CD-ROMs, DVDROMs, RAM, and, flash memory, as well as transmission media, examples of which include, but are not limited to, digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method comprising steps of:
    extracting first meta-attributes based on a first data set of entries and first attributes of said first data set of entries;

extracting second meta-attributes based on a second data set of entries and a second attributes of said first data set of entries;

generating a first projection of the first data set of entries onto said first meta-attributes;

generating a second projection of the second data set of entries onto said second meta-attributes;

based on said first projection, said second projection, and data representing a relationship between said first data set of entries and said second data set of entries, generating data representing a relationship between said first meta-attributes and said second meta-attributes;

generating data representing a relationship between a third data set of entries and a fourth data set of entries, wherein generating data representing a relationship between a third data set of entries and a fourth data set of entries is based on:

a third projection of said third data set of entries onto the first meta-attributes, a fourth projection of said fourth data set of entries onto the second meta-attributes, and said data representing said relationship between said first meta-attributes and second meta-attributes; and wherein the method is executed by one or more computing devices.

2. The method of claim 1, wherein said third data set of entries has third attributes and is a vector containing vector values, each vector value of said vector values representing an attribute of said third attributes;

wherein data representing a relationship between a third data set of entries and a fourth data set of entries comprises particular values, each particular value of said particular values representing a relationship between a particular entry of said fourth data set of entries and said vector;

wherein the method further comprises sorting the particular values.

3. The method of claim 1, wherein generating data representing a relationship between said first meta-attributes and said second meta-attributes comprises use of linear algebra, at least one matrix inversion, a linear algorithm, or generation of a data mining model.

4. The method of claim 1, wherein at least one of generating a first projection and one of generating a second projection is performed using Principal Components Analysis, Independent Components Analysis, Matrix Decompositions, Vector Quantization, Non-Negative Matrix Factorization, or k-means clustering, self-organizing maps clustering, or other clustering methods that provide a soft-clustering or probabilistic output.

5. The method of claim 1, wherein data representing a relationship between said first data set of entries and said second data set of entries represents associations, each association of said associates being between a respective entry of said first data set of entries and a respective entry of said second data set of entries.

6. The method of claim 5, wherein each match of said match is represented by a binary value, a continuous value, or an ordinal value.

7. The method of claim 6, wherein the first data set of entries is a matrix T, wherein the second data set of entries is a matrix A, wherein the third data set of entries is matrix T', wherein the fourth data set of entries is a matrix A'.

8. The method of claim 7, wherein third attributes of the third data set of entries are different than the first attributes.

9. The method of claim 7, the steps further comprising:

factoring the matrix T according to T~G×M, wherein the matrix G includes correspondences of said first data set of entries and said first meta-attributes, and the matrix M includes correspondences of said first meta-attributes and said first attributes, and factoring the matrix A according to A~W×H, wherein the matrix W includes correspondences of said second data set of entries and said second meta-attributes, and matrix M includes correspondences of said second meta-attributes and said second attributes.

10. The method of claim 9, wherein third projection is generated by projecting the matrix T' according to $G'_T \sim T' \times M^{-2}$, wherein the matrix $G'_T$ includes correspondences of said third data set of entries and said first meta-attributes, and the matrix $M^{-2}$ is a matrix pseudo-inverse of the matrix M; and wherein the fourth projection is generated by projecting the matrix A' according to $W'_A \sim A' \times H^{-2}$, wherein matrix $W'_A$ includes correspondences of said fourth data set of entries and said second meta-attributes, and matrix $H^{-2}$ is a matrix pseudo-inverse of the matrix H.

11. The method of claim 9, wherein said data representing a relationship between said first data set of entries and said second data set of entries is a matrix S, wherein said data representing a relationship between said first meta-attributes and second meta-attributes a matrix Z, wherein generating data representing a relationship between said first meta-attributes and said second meta-attributes includes generating said matrix Z according to $Z = G^T \times S \times W$, wherein $G^T \sim T \times M^{-2}$.

12. The method of claim 9, wherein generating data representing a relationship between a third data set of entries and fourth data set of entries comprises generating a matrix S', according to $S' = (G_T^T)^{-2} \times Z \times (W_A)^{-2}$, wherein $(G_T^T)^{-2}$ is said third projection of said third data set of entries to the first meta-attributes, and wherein $(W_A)^{-2}$ is said fourth projection of said fourth data set of entries to the second meta-attributes.

13. One or more non-transitory storage media storing instructions which, when executed by one or more computing devices, cause performance of:

extracting first meta-attributes based on a first data set of entries and first attributes of said first data set of entries;

extracting second meta-attributes based on a second data set of entries and a second attributes of said first data set of entries;

generating a first projection of the first data set of entries onto said first meta-attributes;

generating a second projection of the second data set of entries onto said second meta-attributes;

based on said first projection, said second projection, and data representing a relationship between said first data set of entries and said second data set of entries, generating data representing a relationship between said first meta-attributes and said second meta-attributes; and generating data representing a relationship between a third data set of entries and a fourth data set of entries, wherein generating data representing a relationship between a third data set of entries and a fourth data set of entries is based on:

a third projection of said third data set of entries onto the first meta-attributes, a fourth projection of said fourth data set of entries onto the second meta-attributes, and said data representing said relationship between said first meta-attributes and second meta-attributes.

14. The one or more non-transitory storage media of claim 13,
wherein said third data set of entries has third attributes and is a vector containing vector values, each vector value of said vector values representing an attribute of said third attributes;
wherein data representing a relationship between a third data set of entries and a fourth data set of entries comprises particular values, each particular value of said particular values representing a relationship between a particular entry of said fourth data set of entries and said vector;
wherein the instructions, which executed by said one or more computing devices, further cause sorting the particular values.

15. The one or more non-transitory storage media of claim 13, wherein generating data representing a relationship between said first meta-attributes and said second meta-attributes comprises use of linear algebra, at least one matrix inversion, a linear algorithm, or generation of a data mining model.

16. The one or more non-transitory storage media of claim 13, wherein at least one of generating a first projection and one of generating a second projection is performed using Principal Components Analysis, Independent Components Analysis, Matrix Decompositions, Vector Quantization, Non-Negative Matrix Factorization, or k-means clustering, self-organizing maps clustering, or other clustering methods that provide a soft-clustering or probabilistic output.

17. The one or more non-transitory storage media of claim 13, wherein data representing a relationship between said first data set of entries and said second data set of entries represents associations, each association of said associates being between a respective entry of said first data set of entries and a respective entry of said second data set of entries.

18. The one or more non-transitory storage media of claim 17, wherein each match of said match is represented by a binary value, a continuous value, or an ordinal value.

19. The one or more non-transitory storage media of claim 18, wherein the first data set of entries is a matrix T, wherein the second data set of entries is a matrix A, wherein the third data set of entries is matrix T', wherein the fourth data set of entries is a matrix A'.

20. The one or more non-transitory storage media of claim 19, wherein third attributes of the third data set of entries are different than the first attributes.

21. The one or more non-transitory storage media of claim 19, the instructions, when executed by said one or more computing devices, further causing:
factoring the matrix T according to T~G×M, wherein the matrix G includes correspondences of said first data set of entries and said first meta-attributes, and the matrix M includes correspondences of said first meta-attributes and said first attributes, and
factoring the matrix A according to A~W×H, wherein the matrix W includes correspondences of said second data set of entries and said second meta-attributes, and matrix M includes correspondences of said second meta-attributes and said second attributes.

22. The one or more non-transitory storage media of claim 21,
wherein third projection is generated by projecting the matrix T' according to $G'_T \sim T' \times M^{-2}$, wherein the matrix $G'_T$ includes correspondences of said third data set of entries and said first meta-attributes, and the matrix $M^{-2}$ is a matrix pseudo-inverse of the matrix M; and
wherein the fourth projection is generated by projecting the matrix A' according to $W'_A \sim A' \times H^{-2}$, wherein matrix $W'_A$ includes correspondences of said fourth data set of entries and said second meta-attributes, and matrix $H^{-2}$ is a matrix pseudo-inverse of the matrix H.

23. The one or more non-transitory storage media of claim 21,
wherein said data representing a relationship between said first data set of entries and said second data set of entries is a matrix S,
wherein said data representing a relationship between said first meta-attributes and second meta-attributes a matrix Z,
wherein generating data representing a relationship between said first meta-attributes and said second meta-attributes includes generating said matrix Z according to $Z = G^T \times S \times W$, wherein $G^T \sim T \times M^{-2}$.

24. The one or more non-transitory storage media of claim 21, wherein generating data representing a relationship between a third data set of entries and fourth data set of entries comprises generating a matrix S', according to $S' = (G_T^T)^{-2} \times Z \times (W_A)^{-2}$, wherein $(G_T^T)^{-2}$ is said third projection of said third data set of entries to the first meta-attributes, and wherein $(W_A)^{-2}$ is said fourth projection of said fourth data set of entries to the second meta-attributes.

\* \* \* \* \*

UNITED STATES PATENT AND TRADEMARK OFFICE
CERTIFICATE OF CORRECTION

PATENT NO. : 8,775,466 B2  
APPLICATION NO. : 13/875178  
DATED : July 8, 2014  
INVENTOR(S) : Tamayo et al.

Page 1 of 1

It is certified that error appears in the above-identified patent and that said Letters Patent is hereby corrected as shown below:

In the Specification

In column 9, line 48, delete "$R_1$," and insert -- $R_i$, --, therefor.

In column 12, line 59, delete "CFRS," and insert -- GPRS, --, therefor.

In the Claims

In column 16, line 29, in claim 11, delete "first meta-attributes and second meta-attributes a matrix" and insert -- first meta-attributes and second meta-attributes is a matrix --, therefor.

In column 17, line 15, in Claim 14, delete "which" and insert -- when --, therefor.

In column 18, line 34, in claim 21, delete "first meta-attributes and second meta-attributes a matrix" and insert -- first meta-attributes and second meta-attributes is a matrix --, therefor.

Signed and Sealed this  
Seventh Day of July, 2015

Michelle K. Lee  
*Director of the United States Patent and Trademark Office*